(12) United States Patent
Binder et al.

(10) Patent No.: US 11,905,846 B2
(45) Date of Patent: Feb. 20, 2024

(54) TURBOMACHINE POLYSPHERICAL HUB FOR VARIABLE PITCH BLADES

(71) Applicant: Safran Aircraft Engines, Paris (FR)

(72) Inventors: Anthony Binder, Moissy-Cramayel (FR); Eva Julie Lebeault, Moissy-Cramayel (FR); Laurent Soulat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 20 days.

(21) Appl. No.: 17/640,712

(22) PCT Filed: Sep. 4, 2020

(86) PCT No.: PCT/FR2020/051535
§ 371 (c)(1),
(2) Date: Mar. 4, 2022

(87) PCT Pub. No.: WO2021/044107
PCT Pub. Date: Mar. 11, 2021

(65) Prior Publication Data
US 2022/0333489 A1 Oct. 20, 2022

(30) Foreign Application Priority Data
Sep. 6, 2019 (FR) ........................ 1909824

(51) Int. Cl.
*F01D 5/14* (2006.01)
*F04D 29/32* (2006.01)

(52) U.S. Cl.
CPC ........... *F01D 5/145* (2013.01); *F04D 29/322* (2013.01); *F04D 29/324* (2013.01);
(Continued)

(58) Field of Classification Search
CPC . F01D 5/143; F01D 5/145; F01D 5/30; F01D 5/3023; F05D 2220/36;
(Continued)

(56) References Cited

U.S. PATENT DOCUMENTS 3,357,496 A * 12/1967 Petersen ................. F04D 29/36
416/207
3,428,244 A * 2/1969 Palmer .................... F04D 29/36
416/207
(Continued)

FOREIGN PATENT DOCUMENTS

FR    3 006 988 A1    12/2014
FR    3 048 228 A1    9/2017
FR    3 053 998 A1    1/2018

OTHER PUBLICATIONS

French Search Report for French Application No. 1909824, dated Apr. 24, 2020.
(Continued)

*Primary Examiner* — Brian P Wolcott
(74) *Attorney, Agent, or Firm* — BIRCH, STEWART, KOLASCH & BIRCH, LLP

(57) ABSTRACT

The present invention concerns a turbomachine hub, intended to be mounted so as to be able to rotate about a longitudinal axis (X) of the turbomachine, the hub comprising a main body (1) arranged around the longitudinal axis (X), an outer surface of which has a plurality of recesses; a plurality of platforms (3) comprising an outer surface delimited by a circular outer edge of radius r, each platform (3) being arranged in a corresponding recess of the plurality of recesses of the main body (1), and intended to receive a variable pitch blade (2), the pitch of which is variable according to a pitch change axis (Z), the platform (3) being centred and able to rotate about the pitch change axis (Z); characterised in that, for each platform, at least one part of
(Continued)

the outer surface of the platform (3) and the main body (1) of the hub comprises a curvature defined by a same sphere portion of radius R and centre C, the at least one part being situated at the outer edge of the platform (3), in a junction zone between the platform (3) and the main body of the hub (1), the centre C of the sphere being situated on the pitch change axis (Z) outside a hemispherical zone delimited between the longitudinal axis (X) and the outer surface of the platform (3).

11 Claims, 9 Drawing Sheets

(52) U.S. Cl.
CPC .... *F05D 2220/36* (2013.01); *F05D 2250/241* (2013.01); *F05D 2250/711* (2013.01); *F05D 2250/712* (2013.01)

(58) Field of Classification Search
CPC ............. F05D 2250/241; F04D 29/322; F04D 29/323; F04D 29/34; F04D 29/36; B64C 11/04; B64C 11/06
See application file for complete search history.

(56) References Cited

U.S. PATENT DOCUMENTS

| | | | | | |
|---|---|---|---|---|---|
| 3,720,060 | A | * | 3/1973 | Davies | F02K 3/06 415/129 |
| 3,922,852 | A | * | 12/1975 | Drabek | F01D 7/00 416/165 |
| 4,003,677 | A | * | 1/1977 | Parkes | F04D 29/34 416/214 R |
| 4,045,149 | A | * | 8/1977 | Ravenhall | F01D 5/282 416/135 |
| 4,082,378 | A | * | 4/1978 | Gries | F16C 27/08 384/435 |
| 4,150,914 | A | * | 4/1979 | Karlsson | B63H 5/14 415/129 |
| 4,732,538 | A | * | 3/1988 | Wollenweber | F01D 7/00 416/129 |
| 4,934,904 | A | * | 6/1990 | Kennedy | F04D 29/34 416/207 |
| 4,968,217 | A | * | 11/1990 | Newton | F02K 1/66 416/147 |
| 6,602,049 | B2 | * | 8/2003 | Caubet | F01D 5/143 415/160 |
| 6,991,426 | B2 | * | 1/2006 | Pietricola | F01D 7/00 415/193 |
| 9,200,594 | B2 | * | 12/2015 | Bouiller | F02K 3/06 |
| 9,708,914 | B2 | * | 7/2017 | Fulayter | F01D 5/12 |
| 9,938,000 | B2 | * | 4/2018 | Tajan | F04D 29/323 |
| 10,626,739 | B2 | * | 4/2020 | Iwakiri | F01D 5/02 |
| 10,794,392 | B2 | * | 10/2020 | Foresto | F01D 5/143 |
| 10,968,759 | B2 | * | 4/2021 | Iwakiri | F01D 5/02 |
| 11,118,471 | B2 | * | 9/2021 | Teixeira | F01D 5/143 |
| 2004/0042897 | A1 | | 3/2004 | Pietricola | |
| 2014/0140822 | A1 | * | 5/2014 | Capozzi | F01D 17/162 415/160 |
| 2018/0073375 | A1 | | 3/2018 | Iwakiri | |

OTHER PUBLICATIONS

International Search Report and Written Opinion of the International Searching Authority for International Application No. PCT/FR2020/051535, dated Dec. 22, 2020, with English translation of the Written Opinion.

\* cited by examiner

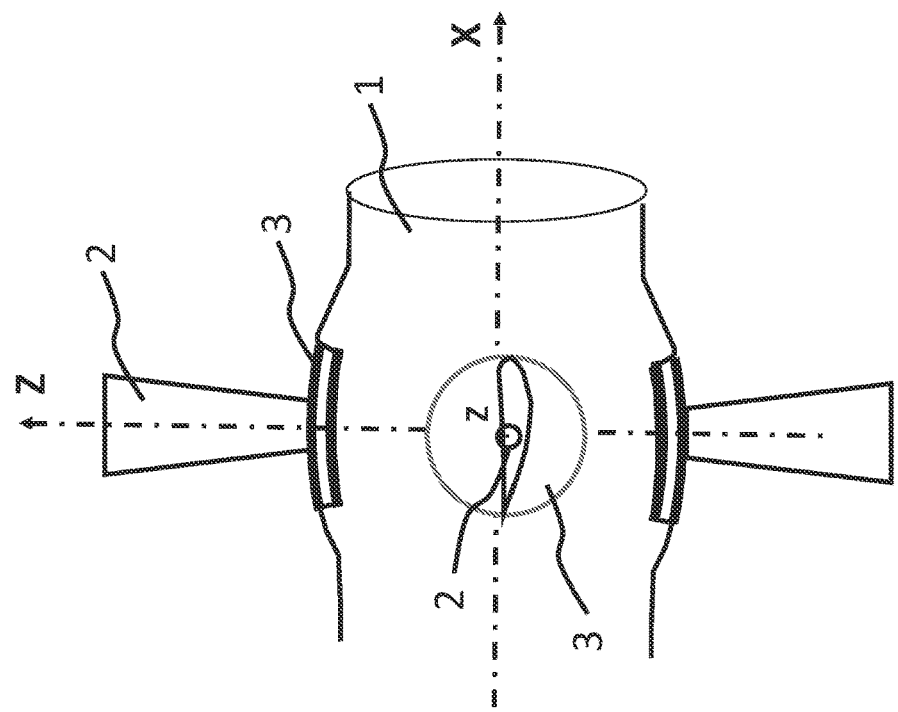
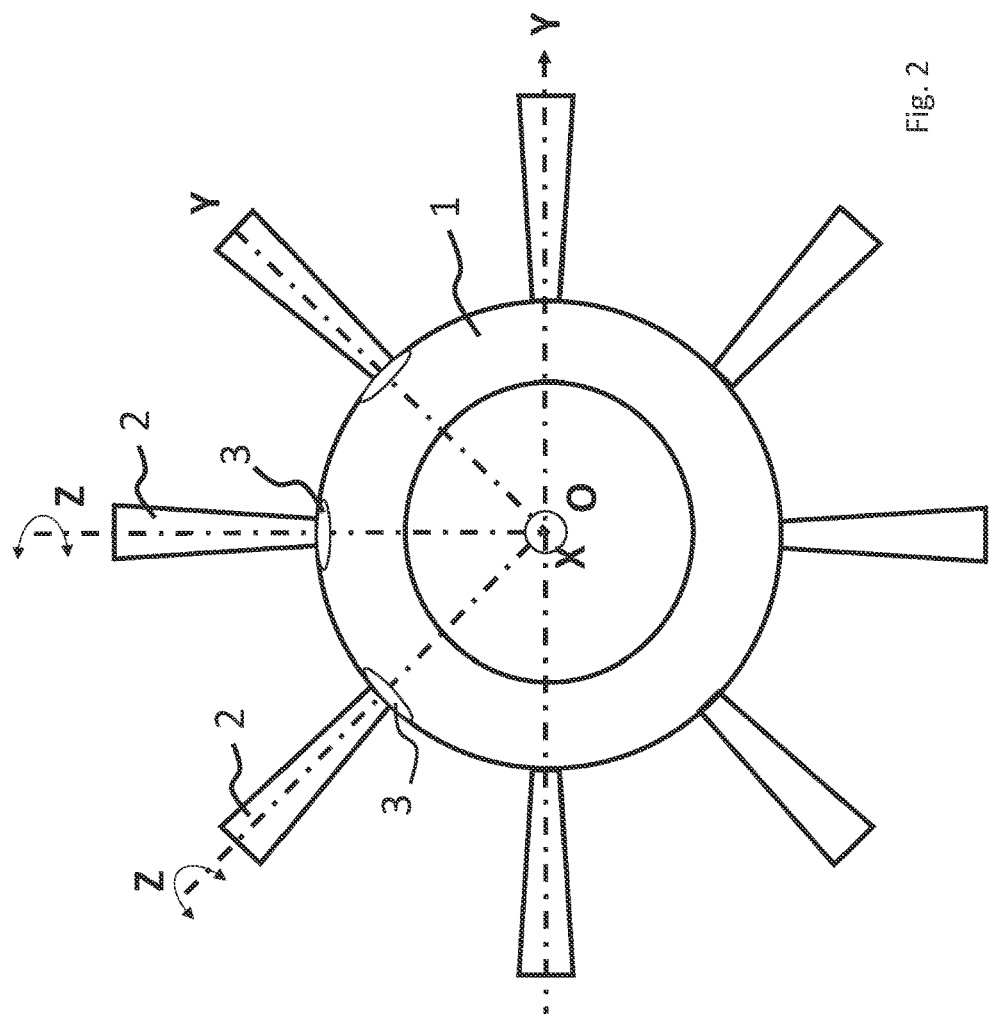
Fig. 2

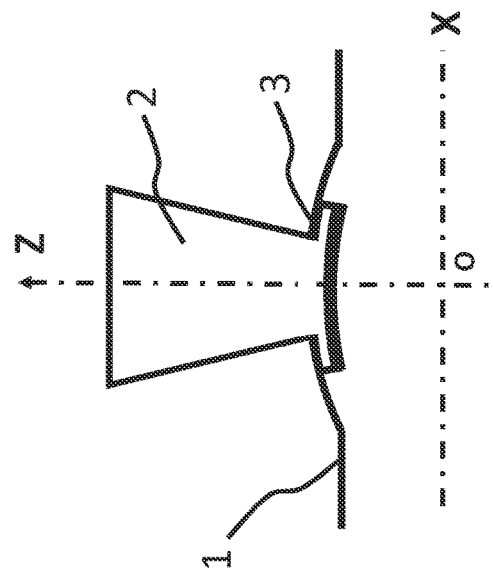
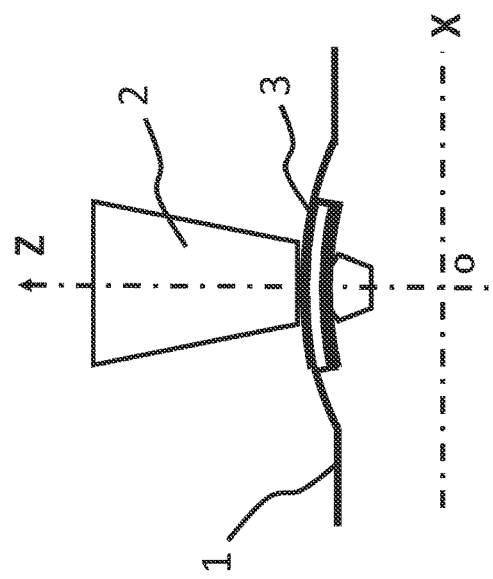
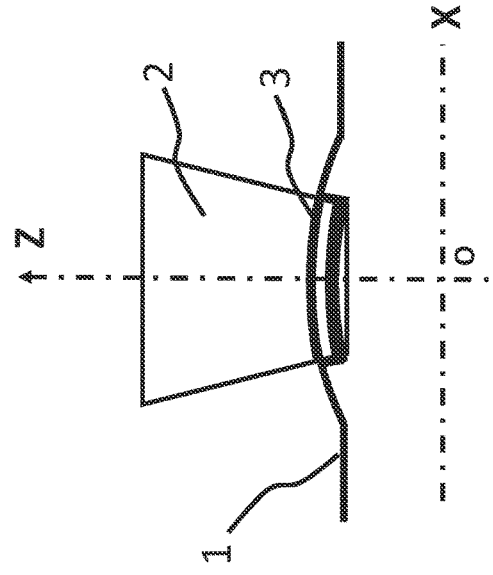

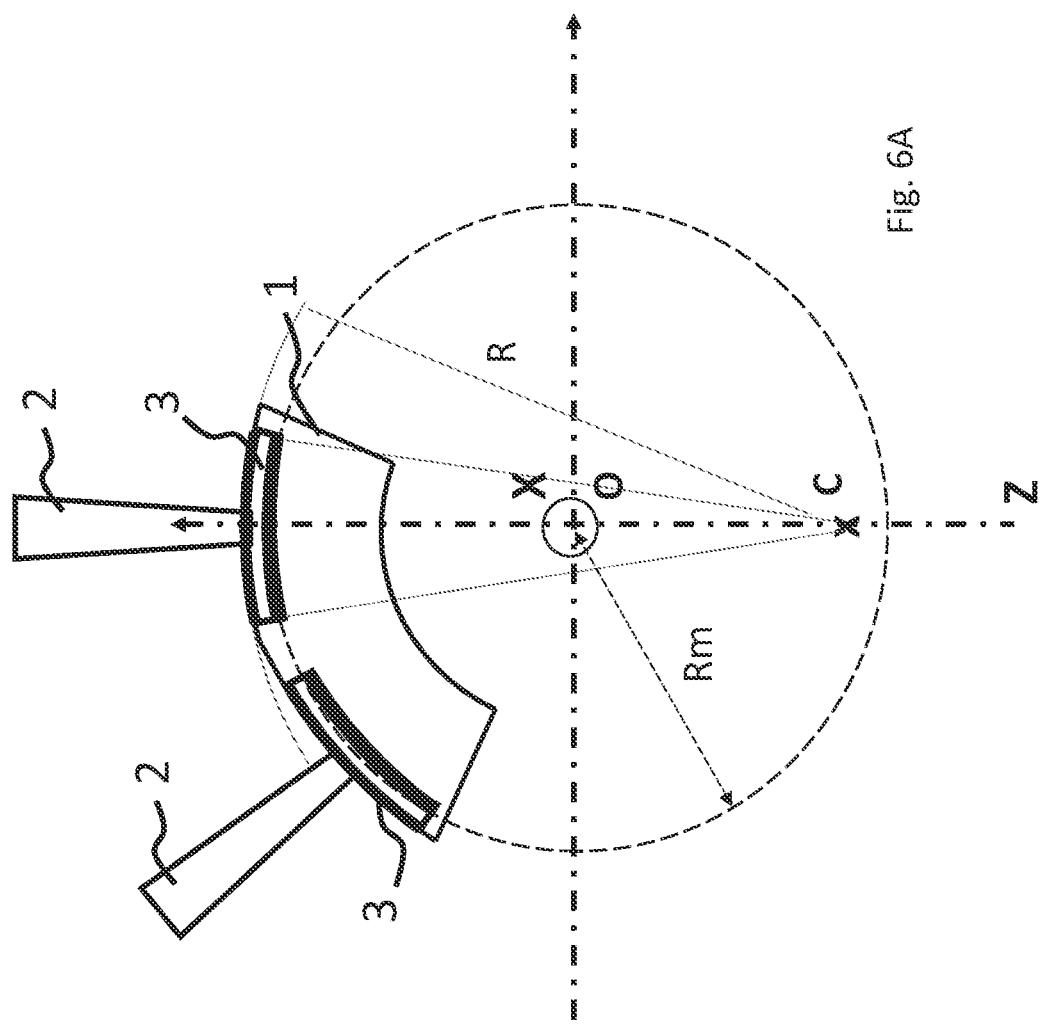

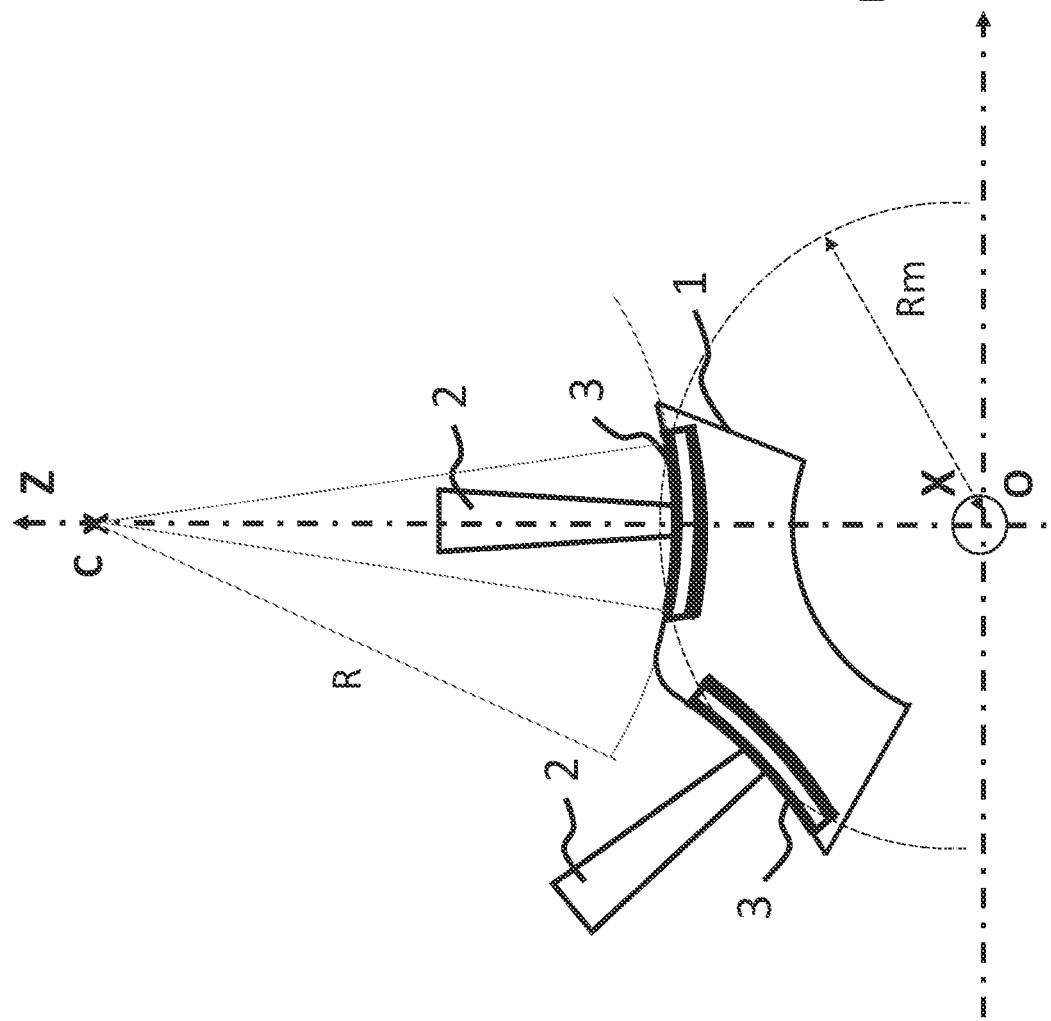

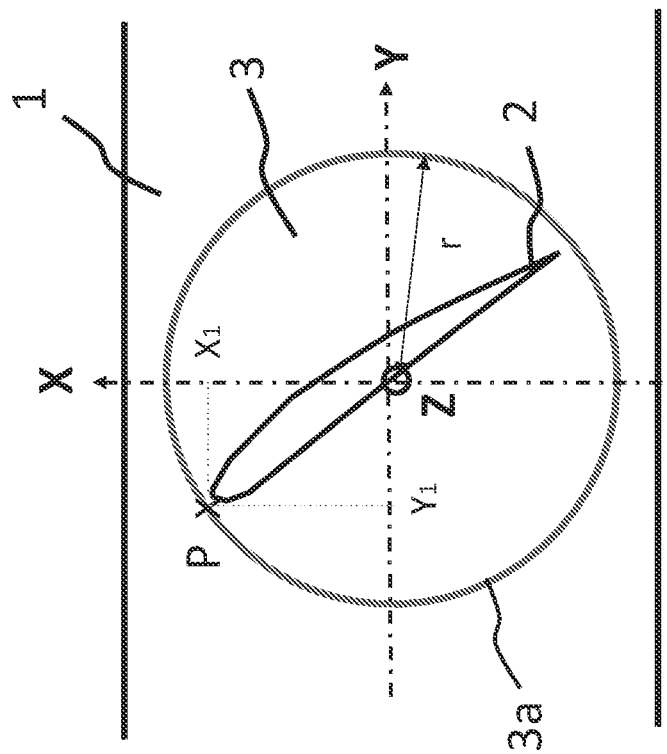
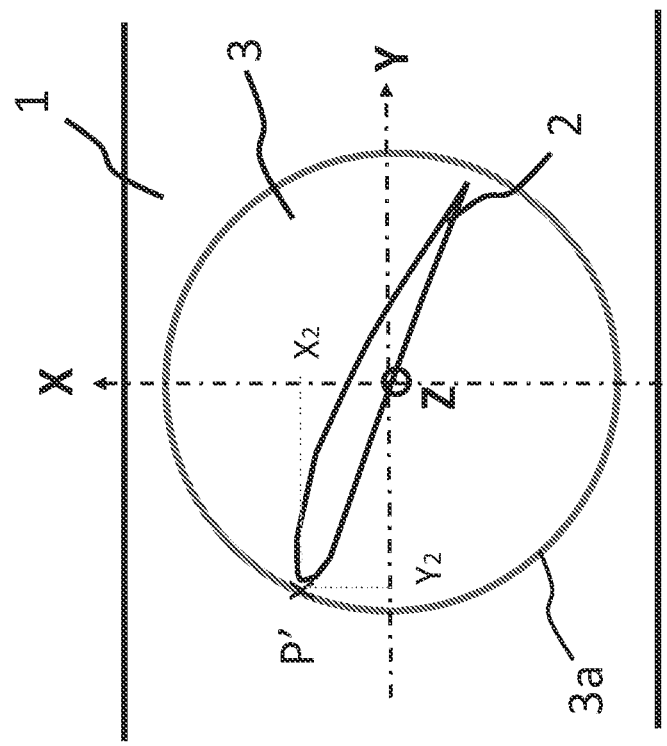
Fig. 7

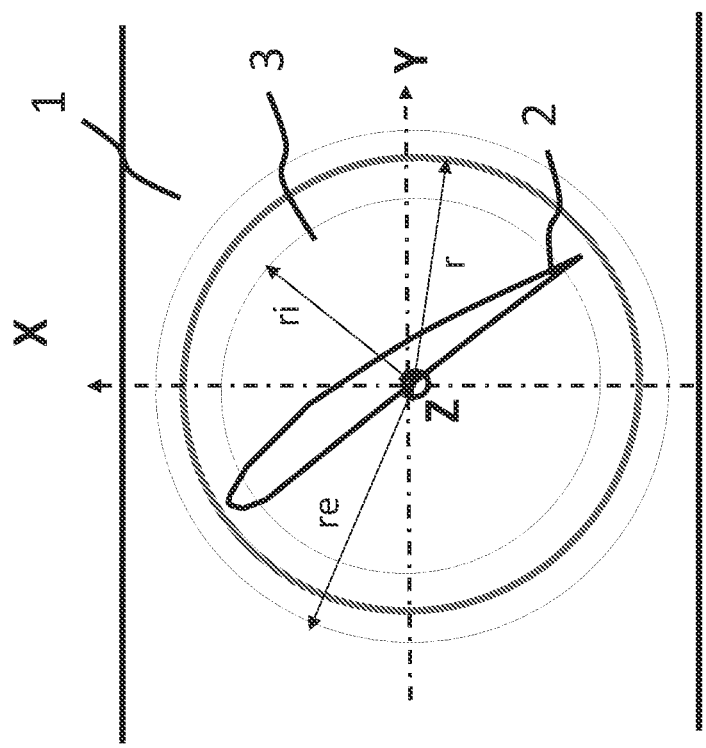
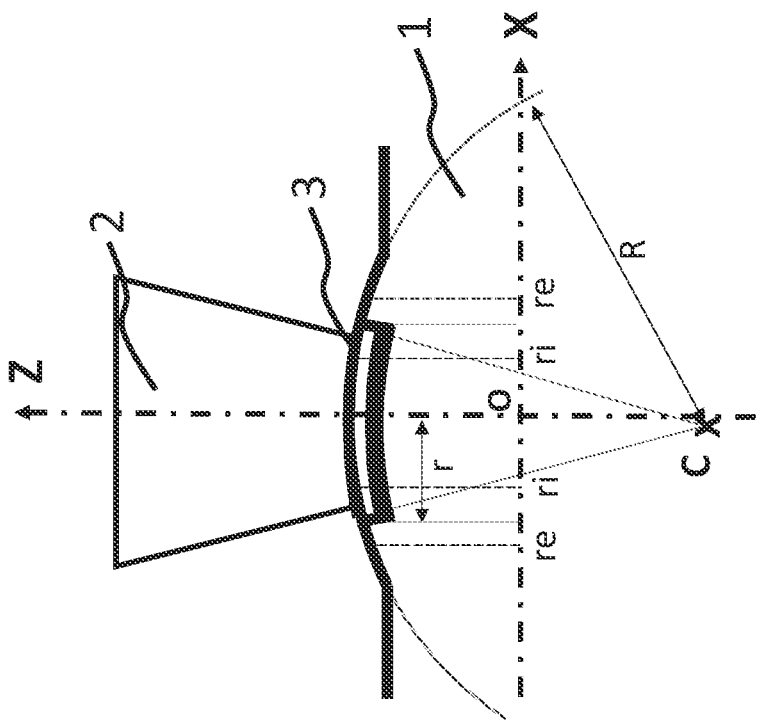
Fig. 8

TURBOMACHINE POLYSPHERICAL HUB FOR VARIABLE PITCH BLADES

FIELD OF THE INVENTION

The present invention relates to the field of propulsion systems for aircraft, particularly turbomachines, and more particularly the improvement of the propulsive efficiency of such propulsion systems.

PRIOR ART

In order to reduce polluting emissions linked to aerial transport, it is essential to seek to improve all the efficiencies of all propulsion systems of aircraft, and more particularly the propulsive efficiency of propulsion systems, i.e. the efficiency with which the energy which is communicated to the air passing through the engine is converted into thrust force usable for propelling the aircraft.

The propulsive efficiency of a propulsion system depends, in the first place, on mechanical elements linked to the low pressure portions of the propulsion system, which contribute in an immediate manner to the generation of thrust. Within the scope of a double flow turbomachine for example, the propulsive efficiency depends in particular on the low-pressure turbine (also called the LP turbine), on the low-pressure transmission system, on the fan and on the secondary stream guiding the flow of air passing through the fan.

In order to improve the propulsive efficiency, a known solution consists of seeking to reduce the compression ratio of the fan, hence reducing the outlet flow speed of the engine and the kinetic energy losses which are linked to it. However, this induces large amplitude variations in the thermodynamic cycle parameters of the turbomachine between ground and flight conditions, in particular as regards the operating temperatures of the high-pressure turbine (also called the HP turbine) and the expansion ratios of the primary and secondary nozzles.

In order to compensate these variations and to guarantee a propulsive efficiency that is high in flight and sufficient on the ground, it is necessary to use a pitch change system for the fan blades.

Moreover, a reduction in the exit speed of the turbomachine has the consequence that the low pressure part must necessarily handle a greater mass flow of secondary air to ensure the same level of thrust, fixed by the characteristics of the aircraft.

This therefore leads to an increase in the bypass ratio of the turbomachine, and to an increase of the secondary flow rate, which has the effect of necessitating the increase in the diameter of the fan. Consequently, this solution requires increasing the outer dimensions of the retention casing surrounding the fan and increasing the dimensions of the nacelle constituting the aerodynamic shell of the casing in question.

Aside from dimensional aspects, the increase in the bypass ratio strongly penalizes the mass of the propulsion system, via in particular a very significant increase of the mass of the fan casing, dimensioned for centrifugal retention in the event of blade ejection.

It is thus noted that the highest bypass ratios, although leading to better propulsive efficiencies, are accompanied by great mass penalties, drag and difficulties in installation below the wing, so that the main part of the expected gain is eclipsed by these strongly penalizing elements.

In order to attempt to minimize the negative effects, the first solution consists of simplifying and lightening the structure of the shroud and the nacelle. It involves, for example, conferring on it only a function of aerodynamic barrier around the fan by eliminating the function of generating reverse thrust, accomplished by thrust reversing doors or grids on the shroud surrounding the fan, and by strongly shortening the air inlet, i.e. the part accomplishing the function of guiding the flow upstream of the fan, and the secondary nozzle which accomplishes the function of controlling the pressure field downstream of the fan (secondary nozzle).

The first solution proposes a turbomachine architecture comprising a fan with a very low pressure ratio, a pitch change system for the blades and a nacelle with a strongly reduced length having an air inlet and a secondary nozzle of reduced length and not integrating thrust reversing grids.

The introduction of a pitch change mechanism for the blades allows control of the operating point of the fan depending on flight conditions.

Several problems can appear, however, when variable pitch is provided for the fan blades.

A conventional blade tip cut-out, complementary to a cylindrical or frusto-conical stream, causes large clearances between the blade tip and the shroud, which are necessary to allow pitch variation without contact, but which cause a non-negligible loss of efficiency by reducing in particular the quality of the aerodynamic flow over the blade. Likewise, a clearance can be necessary at the blade root to allow a rotation of the blade.

These efficiency losses are not acceptable, in particular in the case of a turbomachine with a slow fan rotor and with a very low pressure ratio.

Moreover, customarily in a turbomachine, a hub surface in rotation on which the blades are fixed, describes a circular arc, so that when the pitch is modified, an important discontinuity can form in the form of a step.

This step is also a source of efficiency loss.

A second solution allowing achieving still greater bypass ratios is to withdraw the casing completely and use configurations with propellers. Propulsive architectures thus constituted bear the name of turboprops (case of a single unshrouded low-pressure rotor, called a propeller) or "open rotor" according to the terminology currently used (case of two counter-rotating low-pressure rotors, called counter-rotating propellers).

This alternative architecture, although it allows dispensing with the constraints of mass and of the friction drag of the shroud of the now nonexisting secondary part, poses other problems however. The absence of a shroud around the low-pressure part causes the aerodynamic operation of the rotor to be very sensitive to variations of flight conditions (speed in particular), and limits the maximum flight speed limit allowed by the aircraft.

In order to cause the propeller to operate at its maximum efficiency regardless of conditions, the second solution proposes an architecture comprising a variable pitch, low speed propeller and the absence of a casing.

The use of variable pitch blades, though necessary, adds a technical difficulty to the second architecture proposed because, as previously explained, the use of variable pitch makes difficult the management of steps and clearances between each blade and the hub during rotation, when the pitch of the blade varies. This is the case in particular in upstream propeller architectures (or variable pitch fan architectures) followed by an air inlet for which the flow must be as little distorted as possible. This distortion problem must also be considered within the scope of a variable pitch fan in a double flow engine in which the secondary flow is guided within a casing.

DISCLOSURE OF THE INVENTION

One object of the invention is to at least partly remedy the previously mentioned disadvantages by proposing a turbomachine hub comprising a plurality of platforms intended to receive variable pitch blades, eliminating the steps and the clearances during a pitch rotation between a blade root and a hub on which the blade is fixed while guaranteeing the aerodynamic flow performance at the hub. The platforms are intended to receive variable pitch blades by having said blades pass through them for example via a central hole in which a blade root passes. In this case, each platform can comprise at least one part which is distinct from its corresponding blade and which is installed around said blade. This is referred to as an "applied" platform. As an alternative, each platform can be an extension of the root of the corresponding blade, i.e. the platform and the associated blade are made in a single piece. This is then referred to as an "integrated" platform.

Thus, the invention relates, according to a first aspect, to a turbomachine hub intended to be mounted in rotation along a longitudinal axis of said turbomachine, said hub comprising a main body disposed around the longitudinal axis, of which an outer surface has a plurality of housings;

a plurality of platforms comprising an outer surface delimited by a circular outer edge of radius r, each platform being disposed in a corresponding housing of the plurality of housings of the main body, and intended to receive a variable pitch blade according to a pitch change axis, said platform being centered and movable in rotation along said pitch change axis;

characterized in that, for each platform, at least part of the outer surface of the platform and of the main body of the hub comprises a curvature defined by the same spherical portion of radius R and center C, the at least one part being situated at the outer edge of the platform, in a junction zone between the platform and the main body of the hub, the center C of the sphere being situated on the pitch change axis outside a hemispherical zone delimited between the longitudinal axis and the outer surface of the platform.

The junction zone between the platform and the main body of the hub is understood to be the connection of the platform with the main body of the hub. Thus, this zone consists of a junction of the platform and of the main body of the hub, with a continuity of surface of the platform with the main body of the hub.

The invention according to the first aspect is advantageously completed by the following features, taken alone or in any one of their technically possible combinations:

the outer surface of the platform is entirely defined by the spherical portion of radius R and of center C;

the junction zone is defined by a projection of the junction zone into a plane orthogonal to the pitch change axis, the projection being a ring centered on the pitch change axis and delimited between a circle with inner radius ri less than the radius r of the outer edge of the platform, and a circle with outer radius re greater than the radius r of the outer edge of the platform;

the outer surface of each platform comprises a central part having a curvature opposite to the curvature of the outer surface in the junction zone, a projection of the central part in the plane orthogonal to the pitch change axis being delimited by the circle with inner radius ri;

the center C of the sphere defining the outer surface of each platform is situated at the intersection of the pitch change axis and of the longitudinal axis;

the main body of the hub comprises a plurality of intermediate zones situated between two junction zones with adjacent platforms, each intermediate zone having an outer surface having a curvature opposite to the curvature of the outer surface of the main body in the junction zone;

According to a second aspect, the invention relates to a turbomachine assembly comprising a hub according to the first aspect of the invention and a plurality of variable pitch blades configured to be connected to the main body of the hub by means of the plurality of platforms;

The invention according to the second aspect is advantageously completed by the following features, taken alone or in any one of their technically possible combinations:

each platform of the plurality of platforms is made in one piece with the corresponding blade of the plurality of blades;

each platform comprises at least two distinct parts, intended to surround a root part of the corresponding blade;

the outer surface of each platform is complementary to the shape of the corresponding blade, so that the platform is in contact with the blade from the leading edge of the blade to the trailing edge of the blade, and also in contact with the suction side and the pressure side of the blade.

The invention relates, according to a third aspect, to a turbomachine, shrouded or unshrouded, comprising an assembly according to the second aspect of the invention.

DESCRIPTION OF THE FIGURES

Other features, objects and advantages of the invention will be revealed by the description that follows, which is purely illustrative and not limiting, and which must be read with reference to the appended drawings in which:

FIG. 2 illustrates schematically a front and 90° rotated view of a turbomachine assembly comprising a hub according to one exemplary embodiment.

FIG. 3A illustrates schematically a side view of a variable pitch blade connected to a hub by a platform according to a first exemplary embodiment.

FIG. 3B illustrates schematically a side view of a variable pitch blade connected to a hub by a platform according to a second exemplary embodiment.

FIG. 3C illustrates schematically a side view of a variable pitch blade connected to a hub by a platform according to a second exemplary embodiment.

FIG. 6A illustrates schematically a front view of a turbomachine assembly comprising a polyspherical hub and a plurality of variable pitch blades according to a first exemplary embodiment.

FIG. 6B illustrates schematically a front view of a turbomachine assembly comprising a polyspherical hub and a plurality of variable pitch blades according to a second exemplary embodiment.

FIG. 7 illustrates schematically a top view of the variable pitch blade of FIG. 4, in two different pitch positions.

FIG. 8 illustrates schematically a side view and a top view of the variable pitch blade connected to the polyspherical hub of FIG. 5.

In all the figures, similar elements bear identical reference symbols.

DETAILED DESCRIPTION OF THE INVENTION

Considered is a propulsion system for aircraft of the turbomachine type, comprising an engine shaft mounted in rotation along a longitudinal axis of rotation X, corresponding to an axis of symmetry of the turbomachine.

As previously explained, the turbomachine can have, according to a first exemplary embodiment, a shrouded fan architecture, or according to a second exemplary embodiment, an open rotor architecture.

Figure 1:
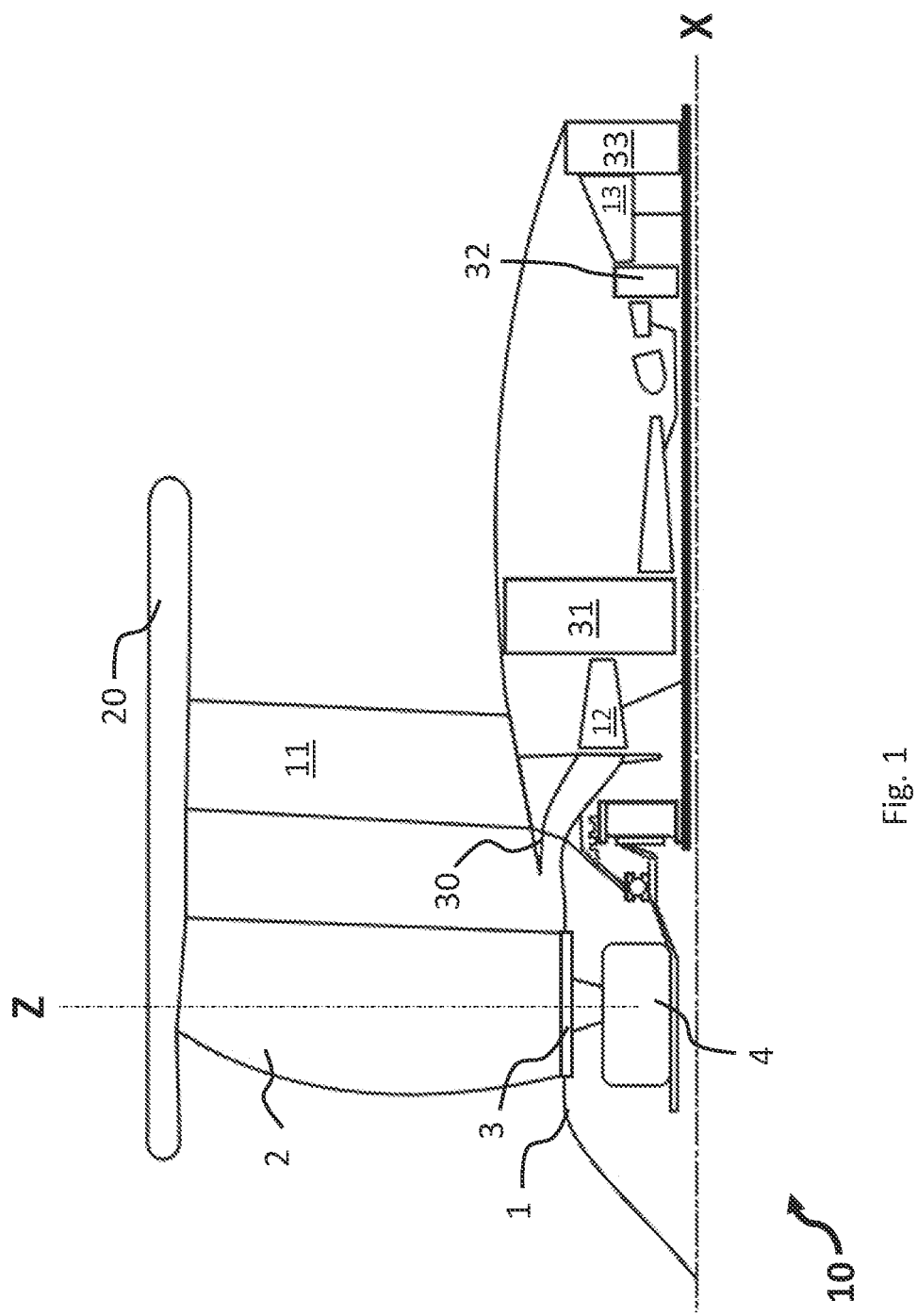
FIG. 1 illustrates schematically a section view of a turbomachine with a shrouded fan.

FIG. 1 illustrates the first example of turbomachine 10 architecture in which the solution to the technical problem posed can be used. The turbomachine 10 has an architecture with a fan with an ultra-high bypass ratio or UHBR. It comprises a compact nacelle 20, particularly with a reduced length. In particular, the nacelle 20 with a reduced length integrates an upstream air inlet and a secondary nozzle downstream of the fan with a reduced length. This nacelle does not integrate a thrust reverser mechanism. It has as its main functions to provide the aerodynamic fairing of the turbomachine 10 and to retain the fan blades 2 and is only dimensioned for this purpose.

A structure 30 defines the outside of a primary stream, a secondary stream being defined between the nacelle and the outside of this structure 30. The structure 30 comprises an inter-compressor casing 31, disposed between a low-pressure compressor 12 and a high-pressure compressor, an inter-turbine casing 32, disposed between a low-pressure turbine 13 and a high-pressure turbine, as well as an exhaust casing 33. A straightener 11 is interposed between the nacelle 20 and the structure 30 and allows retaining said nacelle 20.

In one possible exemplary embodiment, a part of the nacelle 20 can be made common with an already existing surface on the aircraft, such as for example the pressure side of the airfoil. Regardless of the architecture considered, the turbomachine 10 comprises parts mounted in rotation on the axis of rotation X, called the rotor. The rotor comprises a hub driving in rotation around the axis X a plurality of variable geometrical pitch blades 2. A mechanism 4 allows the rotation of each of the blades 2 around a substantially radial axis Z also called the stacking axis Z or pitch change axis Z. It is specified that each blade has its own pitch change axis. What is meant by "substantially radial" is that the axis of rotation Z of the blade 2 is orthogonal to the longitudinal axis of rotation X, or can have an angular offset less than a few degrees with an axis orthogonal to the longitudinal axis of rotation X.

According to conventional usage of the following terms, each blade 2 has a leading edge, facing a flow of air passing through the turbomachine 10, and an opposite trailing edge in the longitudinal direction X, the straight-line segment connecting the trailing edge to the leading edge being defined as the chord considered at a radial position selected radially on the radial axis Z. The blade 2 comprises a face called the suction side extending radially, at which a reduced pressure occurs, and an opposite face called the pressure side, at which an increased pressure occurs.

What is meant by geometric pitch is the angle formed by the chord of the profile of the blade 2 and the plane of rotation of the rotor, defined as a plane orthogonal to the axis of rotation X of the turbomachine 10.

Hereafter, what will be meant by "outer surface" is a surface that is external with regard to the longitudinal axis of rotation X, particularly along which the air flows can circulate.

Conventionally, the variable pitch blades 2 are situated above the hub with a substantially cylindrical shape around the axis of rotation X. The blades 2 can typically be evenly distributed on an outer surface of the hub 1, along its circumference.

FIG. 2 illustrates schematically an exemplary embodiment of the hub in the plane of rotation of the rotor $(O,\vec{Y},\vec{Z})$, and in a plane $(O,\vec{X},\vec{Z})$ tangent to the axis of rotation X.

The hub comprises a main body 1 disposed around the longitudinal axis X. The main body of the hub 1 is fixed in the rotating reference frame of the engine shaft, i.e. it is intended to be driven in rotation by the engine shaft around the longitudinal axis of rotation X.

The main body of the hub 1 generally consists of a single piece. The main body of the hub 1 comprises a plurality of housings. Preferably, the housings are distributed over the outer circumference of the hub 1 concentrically with the longitudinal axis of rotation X. Each housing can have a substantially circular shape, i.e. have an inner edge delimited by a circle of radius r.

The hub comprises a plurality of platforms (3), each disposed in a corresponding housing of the plurality of housings of the main body 1.

According to the example of FIG. 2, it will be understood that each platform (3) is intended to receive a corresponding variable pitch blade (2), and is movable in rotation along a specific radial axis (Z, Z'). Thus, each platform (3) is intended to be secured to a root of the corresponding variable pitch blade (2), and to turn with the blade (2) depending on the desired pitch.

In one exemplary embodiment, each platform (3) can be connected fixedly to a mechanism 4 for actuating the variable pitch ("pitch control mechanism" or PCM), connected by a pivot link to the main body of the hub 1.

Figure 4:
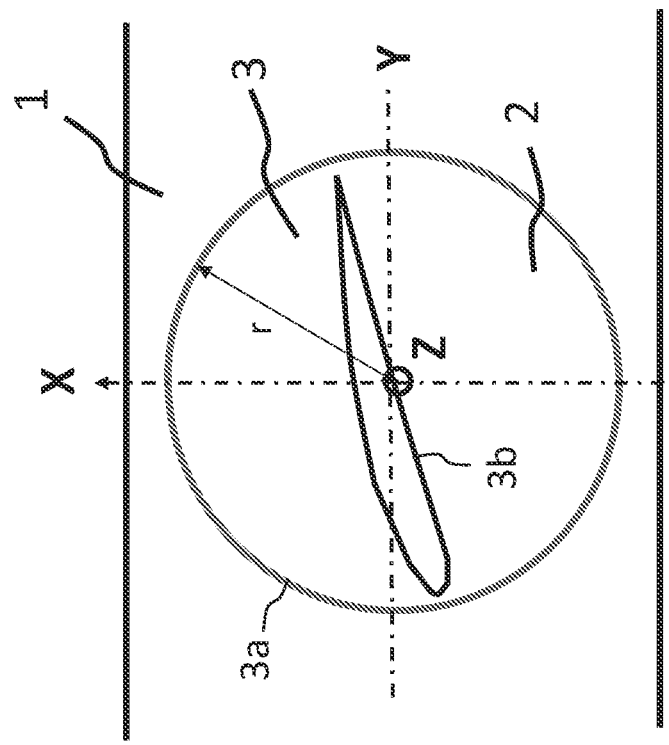
FIG. 4 illustrates schematically a top view of a variable pitch blade connected to a hub by a platform.

FIG. 4 illustrates schematically a top view of an exemplary embodiment of the platform 3, in a plane orthogonal to the pitch change axis Z. Each platform 3 comprises an outer surface delimited by a circular outer edge 3a of radius r. The circular outer edge of radius r forms a junction between the main body of the hub 1 and the platform 3.

The platform 3 comprises a perforation delimited at least by an inner edge 3b of the platform, intended to be in direct contact with the root of the blade 2, or alternatively to be in contact with the root of the blade 2 by means of a gasket. Advantageously, the gasket, preferably made of elastomeric material, can appear in the form of a strand glued or assembled to the platform, with a width equivalent to the clearance existing between the blade root and the platform.

It is not intended for each platform 3 to be fixed in the rotating frame of reference of the engine shaft, but to be mounted in rotation relative to the pitch change axis Z. Each platform 3 is therefore mounted movable in rotation relative to the pitch change axis Z, and is centered on the pitch change axis Z.

The center of the circle of radius r delimiting the outer edge 3a in the plane orthogonal to the pitch change axis Z is disposed on the pitch change axis Z, as illustrated in FIG. 4. This advantageously allows limiting the clearance between the platform 3 and the main body of the hub 1, regardless of the pitch of the blade 2.

As will be detailed hereafter, each platform 3 is designed to provide geometrical continuity between the blade 2 and the main body of the hub 1, over the entire pitch range of the blade 2, while guaranteeing the aerodynamic performance of the hub. Preferably, the shape of the outer surface of each platform 3 and of the main body of the hub 1 allows limiting the perturbations of the boundary layer at the platform 3, and more generally limiting useless perturbations of the air flow.

In order to retain the continuity of the hub at the intersection between the platform 3 and the main body of the hub 2, i.e. along the outer edge 3a of the platform 3, the platforms 3 and the main body of the hub 1 are polyspherical.

Figure 5:
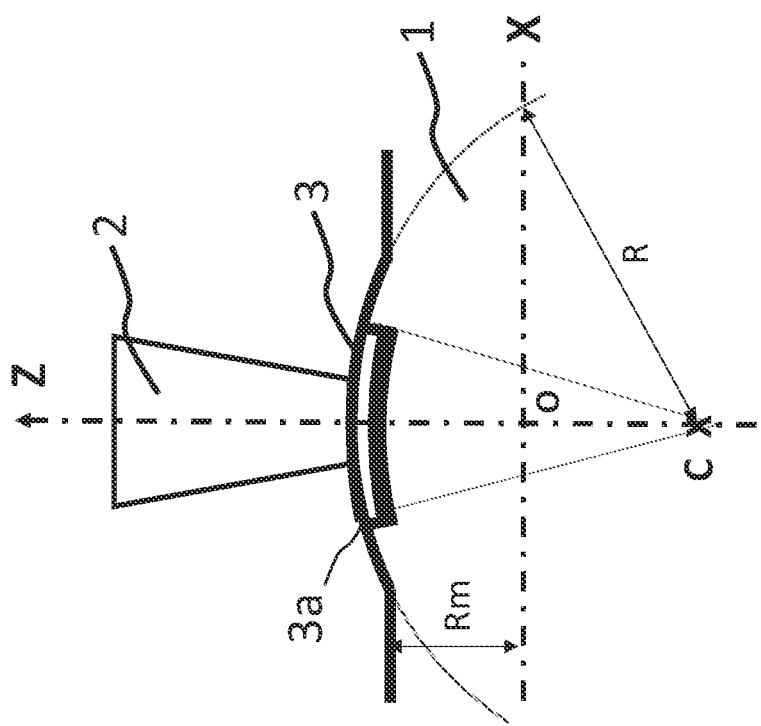
FIG. 5 illustrates schematically a side view of a variable pitch blade connected to a polyspherical hub by a platform.

As illustrated schematically in FIG. 5, what is meant by polyspherical is that at least a part of the outer surface of the platform 3 and of the main body of the hub 1 comprises a curvature defined by the same spherical portion of radius R and with center C, of which the intersection with the plane of FIG. 5 is shown in a thin dotted line. The part of the outer surface of the hub is situated at the outer edge 3a of each platform 3, in a junction zone between the platform 3 and the main body of the hub 1. Here it is specified that the curvature is the inverse of the radius and is therefore inversely proportional. A small radius implies strong curvature.

For each platform 3, the center C of the sphere is situated on the pitch change axis Z, outside a hemispherical zone delimited between the longitudinal axis (X) and the outer surface of the platform 3.

Thus, the circular outer edge 3a corresponds to an apparent contour of the sphere with center C and radius R, i.e. the circle corresponding to the intersection of the sphere with the plane orthogonal to the pitch change axis Z illustrated in FIG. 4. The junction zone extends on the sphere on either side of this apparent contour. There is continuity of the outer surface of the platform 2 with the outer surface of the main body of the hub 1 in the junction zone, regardless of the pitch of the platform 2.

The radius R can be imposed by a minimum or maximum axial position of the platform 3. As illustrated in particular in FIG. 5, the radius R can be different from the radius of the hub Rm at this axial position.

FIG. 6A illustrates a first exemplary embodiment, in which the center C defining the sphere delimiting the junction zone can be situated below the hemispherical zone delimited between the longitudinal axis (X) and the outer surface of the platform 3. As illustrated in the plane (O,Y,Z), the center C is located on the axis Z, below the intersection O between the longitudinal axis of rotation X and the pitch change axis Z. The circle with center O in dashed lines shows the substantially cylindrical cross section of the hub. The construction lines and the circle with center C in thin dotted lines illustrate the cross section of the portion of the sphere defining a part of the outer surface of the platform 3 and of the main body of the hub 1 in the junction zone.

In the first exemplary embodiment, each platform (3, 3') has a substantially convex shape. In the reference frame (O, $\vec{Y},\vec{Z}$), $\vec{OC}=-\|\vec{OC}\|\vec{z}$. In the first example illustrated, $0<\|\vec{OC}\|<Rm$ however, the center C can be outside the circle with center O, so that $\|\vec{OC}\|\geq Rm$.

In a second exemplary embodiment (not illustrated), corresponding to a particular case of the first exemplary embodiment, the center C of the sphere defining in part the outer surface of the platform 3 is situated at the intersection O between the longitudinal axis of rotation X and the pitch change axis X. A spherical hub is then referred to.

As for spherical, it is considered that at least part of the outer surface of each platform 3 and the outer surface of the main body of the hub 1, in the junction zone at the outer edge of the platform 3a, are defined by a spherical portion with center O.

In this particular case, the centers of each sphere defining the outer surface of a platform (3, 3') are congruent. The radius R of the sphere is imposed by the position of the intersection between the axis of rotation of the hub (longitudinal axis X) and the axis of rotation of the platform 3 (pitch change axis Z).

Preferably, the assembly of the main body of the hub 1 and of the platforms 3 follows the definition of the spherical stream at the blades 2. The platforms 3 can then be created by cutting out the hub 1 around each pitch change axis Z.

The second exemplary embodiment has the advantage of retaining a hub with cylindrical symmetry while limiting curvatures. In fact, for each axial position of the blading zone, this solution allows obtaining circular cross sections of the hub and thus limiting curvature in the azimuthal direction. A low curvature allows reducing aerodynamic perturbations at the blade 2 root, and avoiding in particular accelerations of an air flow in these junction zones. Propulsive efficiency losses are thus reduced.

FIG. 6B illustrates a third exemplary embodiment, in which the center C defining the sphere of the platform 3 can be situated above the hemispherical zone delimited between the longitudinal axis (X) and the outer surface of the platform 3, on the pitch change axis Z. The center C is situated above the circle of radius Rm delimiting the substantially circular shape of the hub, shown in dashed lines. The construction lines and the circle with center C in thin dotted lines illustrate the cross section of the portion of the spherical portion defining a part of the outer surface of the platform 3 and of the hub 1.

In the third exemplary embodiment, each platform 3 has a substantially concave shape. Within the frame of reference (O,$\vec{Y},\vec{Z}$), $\vec{OC}=\|\vec{OC}\|\vec{z}$ and $\|\vec{OC}\|>Rm$.

Thus, at least a portion of each platform and of the main body of the hub 1 at the outer edge 3a in the junction zone is defined according to a sphere of radius R and center C, the center C being disposed on the pitch change axis Z of the platform 3, outside the hemisphere with center O and radius Rm, defined in the space$\{x^2+y^2+z^2=Rm^2|z>0\}$.

This allows advantageously limiting the curvatures of the outer surface of the platform 3 and of the main body of the hub 1. In fact, if in the frame of reference (O,$\vec{Y},\vec{Z}$), $\vec{OC}=OC\vec{z}$, and $0<OC<Rm$, the concavity or the convexity of the outer surface of the platform 3 will be large, which can cause aerodynamic perturbations of an air flow passing through the turbomachine 10m and consequently cause a loss of propulsive efficiency.

This definition allows that a point situated on the outer edge 3a of each platform 3 will always be at the same radius R on this portion of the sphere despite the pitch rotation of the associated blade 2 around the axis Z.

FIG. 7 illustrates schematically the two angular positions or different pitches of the blade 2 associated with the platform 3 relative to the main body of the hub 1, in the plane orthogonal to the pitch change axis Z of FIG. 4.

The Cartesian coordinates of any point P situated on the outer edge of the platform of the pitch change axis Z are denoted ($X_i$, $Y_i$, $Z_i$), in the direct orthogonal frame of reference (O, $\vec{X}$, $\vec{Y}$, $\vec{Z}$). The coordinates of the point P prior to pitch variation are denoted ($X_1$,$Y_1$,$Z_1$), and ($X_2$,$Y_2$,$Z_2$) the coordinates of the point P', corresponding to the transformation of the point P by a rotation around the pitch change axis Z, after variation of the pitch.

During a pitch variation, the platform 3 performs a rotation around the axis Z, so that at any point of the outer edge 3a of the platform 3 forming a circle centered on the pitch change axis Z, the coordinate along the pitch change axis Z does not vary. Therefore, $Z_1$=$Z_2$.

In the plane (O,$\vec{X}$,$\vec{Y}$) illustrated in FIG. 7, the point P performs a rotation around the pitch change axis Z so that $X_1^2+Y_1^2=X_2^2+Y_2^2$.

Thus the radius R' relative to the center C of the sphere from the point P' after rotation will be identical to the radius R. In fact, R'=$\sqrt{X_2^2+Y_2^2+Z_2^2}=\sqrt{X_1^2+Y_1^2+Z_1^2}$. The radius R' will therefore not have changed and will be identical to that of the main body of the hub 1 at this position, which allows ensuring the continuity of the outer surface of the hub, therefore of the stream, and not creating steps.

In an exemplary embodiment of the platform 3, shown for example in FIGS. 5 and 6, the outer surface is entirely defined by the spherical portion of radius R and center C.

In order to ensure the continuity of the outer surface of the hub, it is however not necessary that the entire outer surface of each platform 3 be defined by the sphere of center C and radius R.

Likewise, it is not necessary that the entire outer surface of the main body of the hub 1 between the platforms (3, 3') be defined by a sphere.

In one exemplary embodiment, the main body of the hub 1 can comprise a plurality of intermediate zones situated between two junction zones with the adjacent platforms 3, each intermediate zone having an outer surface having a curvature opposite to the curvature of the outer surface of the main body 1 in the junction zone.

Preferably, only a portion of each platform 3 and of the hub 1 is spherical.

As illustrated schematically in FIG. 8, it is possible to define two limit radii: a first inner radius ri and a second outer radius re. The inner ri and outer re radii delimit the junction zone in which the outer surface of the main body 1 and of the platform 3 must at a minimum be defined by the sphere with center C. This junction zone allows guaranteeing a continuity of the stream at the outer edge 3a delimiting the interface between the platform 3 and the main body of the hub 1.

FIG. 8 illustrates in particular a top view of the platform 3, in the plane orthogonal to the pitch change axis Z of FIG. 5. This view illustrates the projection of the junction zone into this plane orthogonal to the pitch change axis (Z), and allows simply defining the junction zone. The radius of the platform in the plane (O,$\vec{X}$,$\vec{Y}$) is denoted r, so that ri<r<re. The projection into this plane is, in this example, a ring centered on the pitch change axis (Z) and delimited between a circle with inner radius ri less than the radius r of the outer edge of the platform 3, and a circle with outer radius re greater than the radius r of the outer edge of the platform 3.

The spherical portion of the main body of the hub 1 and of the platform 3 must allow the continuity, at least in curvature, of the hub in the zone comprised between the radii ri and re.

In a preferred exemplary embodiment, the outer surface of each platform 3 comprises a central part having a curvature opposite to the curvature of the outer surface of the junction zone.

In order to guarantee continuity, the projection of the central part into the plane orthogonal to the pitch change axis (Z) can be delimited by the circle with inner radius ri.

Figure 9:
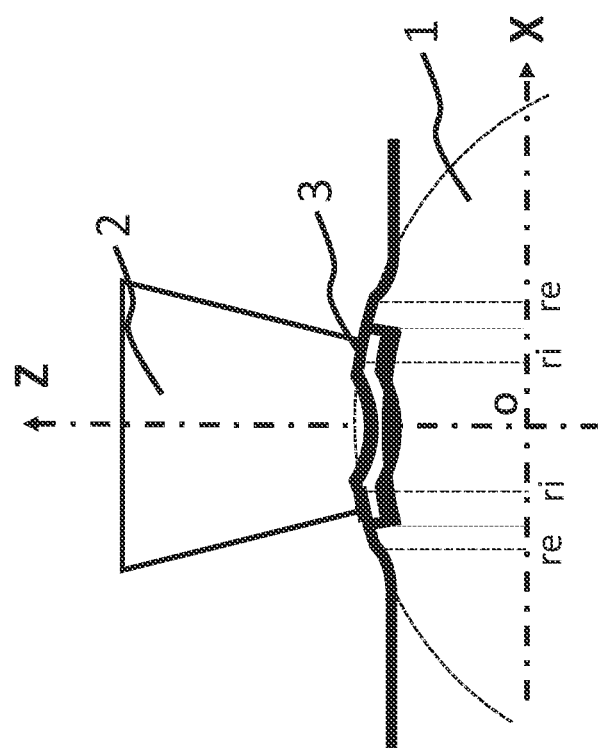
FIG. 9 illustrates schematically a side view of the variable pitch blade connected to the polyspherical hub in another exemplary embodiment.

FIG. 9 illustrates an exemplary embodiment of this type, in which the outer surface of the platform 3 inside the circle defined by ri has a substantially concave shape, while the junction zone between ri and re is convex.

It is advantageous to adapt the geometry of this inner zone to manage the flow speed of a blade 2 root air flow. This has no consequence for the continuity of curvature of the platform 3—main body of the hub 1 interface.

Preferably, the geometry of the outer surface of the main body of the hub 1 outside the circle delimited by re and centered on the pitch change axis Z can be adapted, so as to manage the flow speed of a blade 2 root air flow.

It is for example possible to increase the passage cross section at the blade 2 root by hollowing the main body of the hub 1 between two successive platforms 3. This advantageously allows reducing the relative Mach number on the profiles, which is beneficial for the performance of the turbomachine.

Preferably, the geometry of the main body of the hub 1 outside the circle delimited by re and centered on the pitch change axis Z can be adapted, by increasing the radius Rm in proximity to the pitch change axis Z. This allows facilitating the integration of the pitch change mechanism 4 (PCM).

In the example illustrated in FIG. 9, the main body of the hub 1 comprises a zone outside the junction zone with a concave shape, while the junction zone is convex.

Thus the technical solution proposed allows eliminating the step existing in the prior art between the platform 3 and the main body of the hub 1, while guaranteeing the continuity of curvature of the stream during the pitch rotation, therefore regardless of the pitch of the blade 2. It is thus possible to guarantee good aerodynamic performance and to improve the propulsive efficiency of the turbomachine 10.

According to one aspect, a turbomachine assembly is considered comprising a polyspherical or spherical hub as previously described, and a plurality of variable pitch blades 2 configured to be connected to the main body of the hub 1 by means of the plurality of platforms 3.

FIGS. 3A, 3B and 3C illustrate schematically different exemplary embodiments of the blade 2 with the platform 3.

In one exemplary embodiment illustrated in FIG. 3A, the platform 3 can be an extension of the root of the blade 2, i.e. the platform 3 and the associated blade 2 are made in a single piece. An "integrated" platform is then referred to.

In an alternative exemplary embodiment, the platform 3 can comprise at least one distinct part of the blade 2 and be installed around the blade 2. An "applied" platform is then referred to.

Preferably, the applied platform 3 can be formed from at least two distinct parts intended to surround a root part of the corresponding blade 2.

For example, the platform 3 can comprise a first part intended to be in contact with the pressure side of the blade 2 and a second part intended to be in contact with the suction side of the blade 2. This advantageously allows facilitating the assembly of the platform 3 into the corresponding orifice of the hub 1.

According to one exemplary embodiment of the platform 3 illustrated schematically in FIG. 3B, the root of the blade 2 is configured to extend below the platform 3, and to continue under the hub 1 in the form of an extrusion. In this exemplary embodiment, the platform can surround the blade without radial clearance, which is beneficial from the aerodynamic standpoint, but this constrains the platform to have a radius r greater than or equal to half the chord of the profile of the blade 2 at the root.

Generally, the platform 3 can have a radius r less than half the chord of the profile of the blade 2 at the root, so that there exists a radial clearance between the platform 3 and the trailing edge and leading edge points of the blade 2. This could however induce a greater perturbation of the air flow.

According to a preferred exemplary embodiment illustrated in FIG. 3C, the outer surface of the platform 3 is complementary with the shape of the blade 2, so that the platform is in contact with the blade 2 from the leading edge of the blade 2 to the trailing edge, and is also in contact with the suction side and the pressure side. This advantageously allows avoiding the creation of radial clearance, and guaranteeing the continuity of the shape between the blade 2 and the platform 3. In this example, illustrated in FIG. 3C, a particular case is involved of that illustrated in FIG. 3B, in which r=chord/2.

As explained previously, an assembly of this type can be advantageously used for a turbomachine with a shrouded fan or for a turbomachine with an unshrouded fan, of the "open rotor" type.

The invention claimed is:

1. A turbomachine hub to be mounted in rotation along a longitudinal axis of a turbomachine, the turbomachine hub comprising a main body disposed around the longitudinal axis, of which an outer surface has a plurality of housings;
   a plurality of platforms comprising an outer surface delimited by a circular outer edge of radius r, each platform being disposed in a corresponding housing of the plurality of housings of the main body, and intended configured to receive a variable pitch blade according to a pitch change axis, each platform being centered and movable in rotation along the pitch change axis;
   wherein, for each platform, at least part of the outer surface of each platform and of the main body of the turbomachine hub comprises a curvature defined by a same spherical portion of radius R and center C, the at least part of the outer surface being situated at the outer edge of each platform, in a junction zone of each platform and of the main body of the turbomachine hub,
   the center C being situated on the pitch change axis outside a hemispherical zone delimited between the longitudinal axis and the outer surface of each platform.

2. The turbomachine hub according to claim 1, wherein the outer surface of the platform is entirely defined by the spherical portion of radius R and center C.

3. The turbomachine hub according to claim 1, wherein the junction zone is defined by a projection of the junction zone into a plane orthogonal to the pitch change axis, the projection being a ring centered on the pitch change axis and delimited between a circle with inner radius ri less than the radius r of the outer edge of each platform, and a circle with outer radius re greater than the radius r of the outer edge of each platform.

4. The turbomachine hub according to claim 3, wherein the outer surface of each platform comprises a central part having a curvature opposite to the curvature of the outer surface in the junction zone, a projection of the central part in the plane orthogonal to the pitch change axis being delimited by the circle of inner radius ri.

5. The turbomachine hub according to claim 1, wherein the center C defining the outer surface of each platform is situated at the intersection of the pitch change axis and of the longitudinal axis.

6. The turbomachine hub according to claim 1, wherein the main body of the turbomachine hub comprises a plurality of intermediate zones situated between two junction zones with adjacent platforms of the plurality of platforms, each intermediate zone having an outer surface having a curvature opposite to the curvature of the outer surface of the main body in the junction zone.

7. A turbomachine assembly comprising a turbomachine hub according to claim 1 and a plurality of variable pitch blades configured to be connected to the main body of the turbomachine hub by means of the plurality of platforms.

8. The assembly according to claim 7, wherein each platform of the plurality of platforms is made in one piece with a corresponding blade of the plurality of blades.

9. The assembly according to claim 7, wherein each platform comprises at least two distinct parts, intended to surround a root part of a corresponding blade.

10. The assembly according to claim 7, wherein the outer surface of each platform is complementary to the shape of a corresponding blade, so that the platform is in contact with the corresponding blade from a leading edge of the corresponding blade to a trailing edge of the corresponding blade, and is also in contact with a suction side and a pressure side of the corresponding blade.

11. A turbomachine with a shrouded or unshrouded fan, comprising an assembly according to claim 7.

* * * * *